(12) United States Patent
Wang

(10) Patent No.: US 12,366,891 B2
(45) Date of Patent: Jul. 22, 2025

(54) SUPPORT PLATE, FLEXIBLE DISPLAY PANEL, AND ELECTRONIC DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: WUHAN CHINA STAR OPTOELECTONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/613,566

(22) PCT Filed: Oct. 22, 2021

(86) PCT No.: PCT/CN2021/125693
§ 371 (c)(1),
(2) Date: Nov. 23, 2021

(87) PCT Pub. No.: WO2023/039992
PCT Pub. Date: Mar. 23, 2023

(65) Prior Publication Data
US 2024/0255999 A1 Aug. 1, 2024

(30) Foreign Application Priority Data
Sep. 16, 2021 (CN) .......................... 202111086800.6

(51) Int. Cl.
*G06F 1/16* (2006.01)
(52) U.S. Cl.
CPC .......... *G06F 1/1656* (2013.01); *G06F 1/1616* (2013.01); *G06F 1/1652* (2013.01)

(58) Field of Classification Search
CPC ..... H01L 51/56; H05K 5/0017; G06F 1/1652; G06F 1/1616; G09F 9/301
See application file for complete search history.

(56) References Cited

U.S. PATENT DOCUMENTS 11,979,997 B2 * 5/2024 Kwak ................... G06F 1/1641
2019/0130796 A1 5/2019 Kang et al.
(Continued)

FOREIGN PATENT DOCUMENTS

| CN | 109326224 A | 2/2019 |
| CN | 112419894 A | 2/2021 |

OTHER PUBLICATIONS

Chinese Office Action issued in corresponding Chinese Patent Application No. 202111086800.6 dated Apr. 18, 2022, pp. 1-9.
(Continued)

*Primary Examiner* — Allen L Parker
*Assistant Examiner* — Peter Krim
(74) *Attorney, Agent, or Firm* — Nathan & Associates Patent Agents Ltd.; Menachem Nathan

(57) ABSTRACT

The present application provides a support plate, a flexible display panel, and an electronic device. The electronic device includes a flexible display panel. The flexible display panel includes a flexible display panel main body and a support plate. The support plate includes a bidirectional bending portion. By defining a third patterned structure at an intersection of a first patterned structure and a second patterned structure in the bidirectional bending portion, a bending stiffness of the bidirectional bending portion is reduced, thereby reducing a risk of debonding of a module and fracturing of a display device layer.

20 Claims, 5 Drawing Sheets

(56) References Cited

U.S. PATENT DOCUMENTS

| | | | |
|---|---|---|---|
| 2020/0103741 A1* | 4/2020 | Song | H04N 9/3173 |
| 2020/0319672 A1* | 10/2020 | Kim | H04M 1/0268 |
| 2021/0153363 A1* | 5/2021 | Cao | H05K 5/0017 |
| 2021/0259110 A1 | 8/2021 | Ha et al. | |
| 2022/0238049 A1* | 7/2022 | Min | G09F 9/301 |

OTHER PUBLICATIONS

Chinese Office Action issued in corresponding Chinese Patent Application No. 202111086800.6 dated Sep. 7, 2022, pp. 1-4.
International Search Report in International application No. PCT/CN2021/125693, mailed on Jun. 16, 2022.
Written Opinion of the International Search Authority in International application No. PCT/CN2021125693, mailed on Jun. 16, 2022.
Japanese Office Action issued in corresponding Japanese Patent Application No. 特願 2022-518693 dated Feb. 13, 2024, pp. 1-4.

\* cited by examiner

SUPPORT PLATE, FLEXIBLE DISPLAY PANEL, AND ELECTRONIC DEVICE

BACKGROUND OF DISCLOSURE

1. Field of Disclosure

The present invention relates to a field of display technology, and in particular, to a support plate, a flexible display panel, and an electronic device.

2. Description of Related Art

In recent years, the development of flexible organic light-emitting diode (OLED) display technology has greatly promoted the development of foldable mobile phones and tablet computers. The flexible OLED display technology has entered a comprehensive commercialization stage. The launch of foldable mobile phones and foldable tablet computers has been favored by consumers, and the market share of foldable mobile phones has been continuously expanding. On the basis of foldable mobile phones, users' demands for folding display products in new types and new folding modes are becoming more and more diversified. In this background, major display terminal manufacturers and display manufacturers have successively introduced concept products such as surround screens, curved screens, and stretchable screens. New types of display products are becoming more and more abundant and diversified, from two-fold to three-fold, from unidirectional folding to bidirectional folding, from pure curl to research into stretchable and expandable display products. It is foreseeable that based on flexible OLED display technology, new forms and new concepts of display products will continue to emerge in the next few years.

Currently, transverse and longitudinal bidirectional foldable mobile phones and tablet computers integrate hinge technology and flexible OLED display technology, and the display device is designed to be folded in or out in two directions at the same time, that is, in a cross-folded form. Therefore, in terms of effect, it can be used not only as a mobile phone, but also as a laptop. However, the biggest difficulty of this design concept is that the flexible display panel is subjected to alternating stresses in two directions caused by bidirectional folding in the transversely and longitudinally crisscross area. In this area, the debonding of the module film layer and the breakage of the display function layer device are often the first to appear In summary, existing flexible display panels and electronic devices have problems of module debonding and display device layer fracturing in a crisscross bending region. Therefore, it is necessary to provide a support plate, a flexible display panel, and an electronic device to improve this defect.

SUMMARY

The embodiments of the present application provide a flexible display panel and an electronic device, which are used to solve the problem that the size of the hinge and the main body of the flexible display panel cannot match each other in the existing flexible display panel and the electronic device.

The embodiment of the present application provides a supporting plate, including:
a first bending portion, extending along a first direction;
a second bending portion, extending along a second direction, wherein the first direction crosses the second direction; and
a bidirectional bending portion, disposed at an intersection of the first bending portion and the second bending portion, including:
a plurality of first patterned structures, extending along the first direction and arranged along the second direction;
a plurality of second patterned structures, extending along the second direction and arranged along the first direction; and
a plurality of third patterned structures, defined at an intersection of the first patterned structures and the second patterned structures.

According to an embodiment of the present application, the first patterned structures partially extend into the support plate in a third direction, and the second patterned structures partially extend into the support plate in the third direction, the third direction is perpendicular to the first direction and the second direction.

According to an embodiment of the present application, the third patterned structures penetrate the support plate in the third direction.

According to an embodiment of the present application, a cross-sectional profile of the third patterned structure is a circle, an ellipse, a rounded rectangle, or a cross.

According to an embodiment of the present application, an aperture of the third patterned structure is less than or equal to a width of the first patterned structure in the second direction, and the aperture of the third patterned structure is less than or equal to a width of the second patterned structure in the first direction.

According to an embodiment of the present application, the aperture of the third patterned structure gradually increases or gradually decreases from an edge of the bidirectional bending portion to a center of the bidirectional bending portion.

According to an embodiment of the present application, the first patterned structures extend along the first direction from a first end of the bidirectional bending portion to a second end of the bidirectional bending portion, and a plurality of the first patterned structures are arranged side by side in the second direction.

The second patterned structures extend along the second direction from a third end of the bidirectional bending portion to a fourth end of the bidirectional bending portion, and a plurality of the second patterned structures are arranged side by side in the first direction.

According to an embodiment of the present application, the first patterned structures extend along the first direction from the first end and the second end of the bidirectional bending portion to a first end and a second end of the first bending portion, respectively.

The second patterned structures extend along the second direction from the third end and the fourth end of the bidirectional bending portion to a first end and a second end of the second bending portion, respectively.

According to an embodiment of the present application, in the second direction, a width of the first patterned structure is equal to a distance between adjacent first patterned structures.

In the first direction, a width of the second patterned structure is equal to a distance between adjacent second patterned structures.

According to an embodiment of the present application, when the support plate is in a first bending state, a curvature radius of the bidirectional bending portion is equal to the curvature radius of the bidirectional bending portion when the support plate is in a second bending state.

The embodiment of the present application also provides a flexible display panel, including:
- a flexible display panel main body; and
- a support plate, disposed at a bottom of the flexible display panel main body, including:
  - a first bending portion, extending along a first direction:
  - a second bending portion, extending along a second direction, the first direction crosses the second direction; and
  - a bidirectional bending portion, disposed at an intersection of the first bending portion and the second bending portion, including:
    - a plurality of first patterned structures, extending along the first direction and arranged along the second direction;
    - a plurality of second patterned structures, extending along the second direction and arranged along the first direction; and
    - a plurality of third patterned structures, defined at an intersection of the first patterned structures and the second patterned structures.

According to an embodiment of the present application, the first patterned structures partially extend into the support plate in a third direction, and the second patterned structures partially extend into the support plate in the third direction, the third direction is perpendicular to the first direction and the second direction.

According to an embodiment of the present application, the third patterned structures penetrate the support plate in the third direction.

According to an embodiment of the present application, a cross-sectional profile of the third patterned structure is a circle, an ellipse, a rounded rectangle, or a cross.

According to an embodiment of the present application, an aperture of the third patterned structure is less than or equal to a width of the first patterned structure in the second direction, and the aperture of the third patterned structure is less than or equal to a width of the second patterned structure in the first direction.

According to an embodiment of the present application, the aperture of the third patterned structure gradually increases or gradually decreases from an edge of the bidirectional bending portion to a center of the bidirectional bending portion.

According to an embodiment of the present application, the first patterned structures extend along the first direction from a first end of the bidirectional bending portion to a second end of the bidirectional bending portion, and a plurality of the first patterned structures are arranged side by side in the second direction.

The second patterned structures extend along the second direction from a third end of the bidirectional bending portion to a fourth end of the bidirectional bending portion, and a plurality of the second patterned structures are arranged side by side in the first direction.

According to an embodiment of the present application, the first patterned structures extend along the first direction from the first end and the second end of the bidirectional bending portion to a first end and a second end of the first bending portion, respectively.

The second patterned structures extend along the second direction from the third end and the fourth end of the bidirectional bending portion to a first end and a second end of the second bending portion, respectively.

According to an embodiment of the present application, in the second direction, a width of the first patterned structure is equal to a distance between adjacent first patterned structures.

In the first direction, a width of the second patterned structure is equal to a distance between adjacent second patterned structures.

The embodiment of the present application further provides an electronic device, including a flexible display panel, the flexible display panel includes a flexible display panel main body and a support plate, the support plate is disposed at a bottom of the flexible display panel main body, the support plate includes:
- a first bending portion, extending along a first direction:
- a second bending portion, extending along a second direction, the first direction crosses the second direction; and
- a bidirectional bending portion, disposed at an intersection of the first bending portion and the second bending portion, including:
  - a plurality of first patterned structures, extending along the first direction and arranged along the second direction:
  - a plurality of second patterned structures, extending along the second direction and arranged along the first direction; and
  - a plurality of third patterned structures, defined at an intersection of the first patterned structures and the second patterned structures.

The beneficial effects of the embodiments of the present disclosure:

The present application embodiment provides a support plate, a flexible display panel, and an electronic device. The electronic device includes the flexible display panel. The flexible display panel includes a flexible display panel main body and a support plate. The support plate is disposed at the bottom of the flexible display panel main body. The supporting plate includes a first bending portion, a second bending portion, and a bidirectional bending portion. The first bending portion extends along a first direction. The second bending portion extends along a second direction, where the first direction crosses the second direction. The bidirectional bending portion is disposed at an intersection of the first bending portion and the second bending portion. The bidirectional bending portion includes a plurality of first patterned structures, a plurality of second patterned structures, and a plurality of third patterned structures. The plurality of first patterned structures extend along the first direction and are arranged along the second direction. The plurality of second patterned structures extend along the second direction and are arranged along the first direction. By disposing a third patterned structure at an intersection of a first patterned structure and a second patterned structure, a bending stiffness of the bidirectional bending portion is reduced, so that the support plate can adapt to a bending stress and deformation of adjacent glue layer or film layer, thereby reducing a risk of debonding of the module and fracture of the display device layer due to mismatched stress and uncoordinated deformation between the support plate and the film layer, and improving an overall yield and reliability of flexible display panels and electronic devices.

BRIEF DESCRIPTION OF DRAWINGS

To explain the embodiments or the technical solutions in the prior art more clearly, the following will briefly introduce the figures that need to be used in the description of the embodiments or the prior art. Obviously, the figures in the following description are only for some embodiments disclosed. Those of ordinary skill in the art can obtain other figures based on these figures without creative work.

DETAILED DESCRIPTION OF EMBODIMENTS

Figure 1:
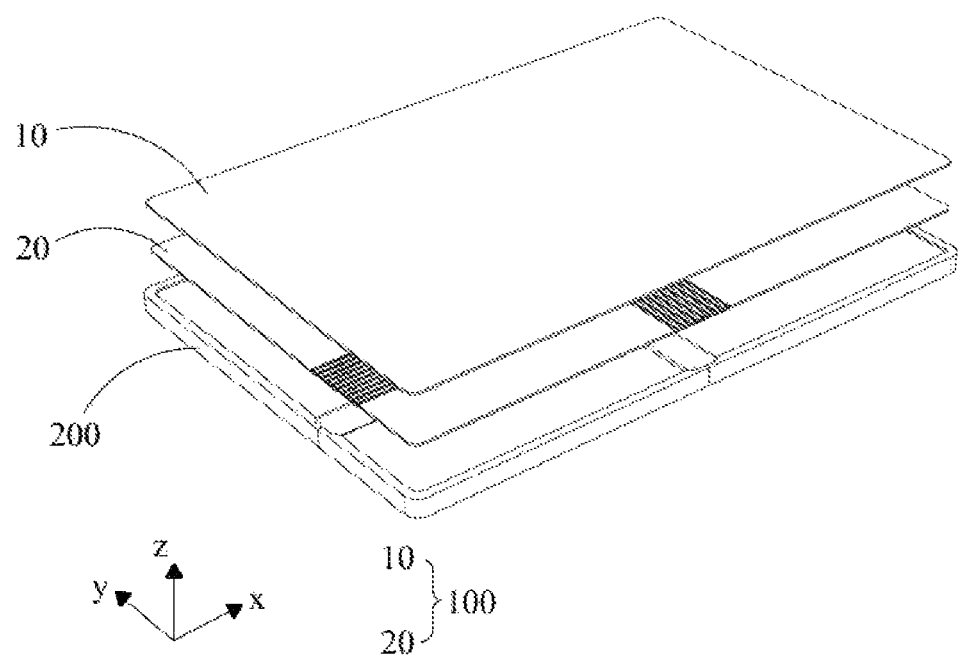
FIG. 1 is an exploded schematic diagram of an electronic device provided by an embodiment of the application.

The description of the following embodiments refers to the attached figures to illustrate specific embodiments that the present disclosure can be implemented. The directional terms mentioned in this disclosure, such as "on", "under", "in front of", "behind", "left", "right", "inside", "outside", "side", etc., only refer to the direction of the attached figures. Therefore, the directional terms used are used to illustrate and help understand the present disclosure, rather than to limit the present disclosure. In the figures, units with similar structures are indicated by the same reference numerals.

The disclosure will be further described below in conjunction with the figures and specific embodiments:

The embodiment of the present application provides a support plate, a flexible display panel, and an electronic device. As shown in FIG. 1, FIG. 1 is an exploded schematic diagram of the electronic device provided by the present application embodiment. The electronic device includes a flexible display panel 100 and a middle frame 200, where the flexible display panel 100 can be installed on the middle frame 200.

The flexible display panel 100 includes a flexible display panel main body 10 and a support plate 20, where the support plate 20 is disposed at a bottom of the flexible display panel main body 10. The support plate 20 and the flexible display panel main body 10 can be glued into one body and then installed onto the middle frame 200 of the electronic device.

In the embodiment of the present application, the electronic device can be a mobile terminal, such as a smartphone, a tablet computer, a notebook computer, etc. The electronic device can also be a wearable terminal, such as a smartwatch, a smart bracelet, smart glasses, and augmented reality equipment. The electronic device can also be a fixed terminal, such as a desktop computer, a TV, and so on.

In the embodiment of the present application, the flexible display panel main body 10 is a flexible organic light-emitting diode (OLED) display panel. In practical applications, the type of the flexible display panel main body 10 is not limited to a flexible OLED display panel, but can also be a mini-LED display panel or a Micro LED display panel.

In the embodiment of the present application, the material of the support plate 20 is stainless steel (SUS), so that the support plate 20 has good stiffness and bending performance. In practical applications, the material of the support plate 20 is not limited to stainless steel, and can also be alloys such as titanium alloys or aluminum alloys or other metal materials.

Figure 2:
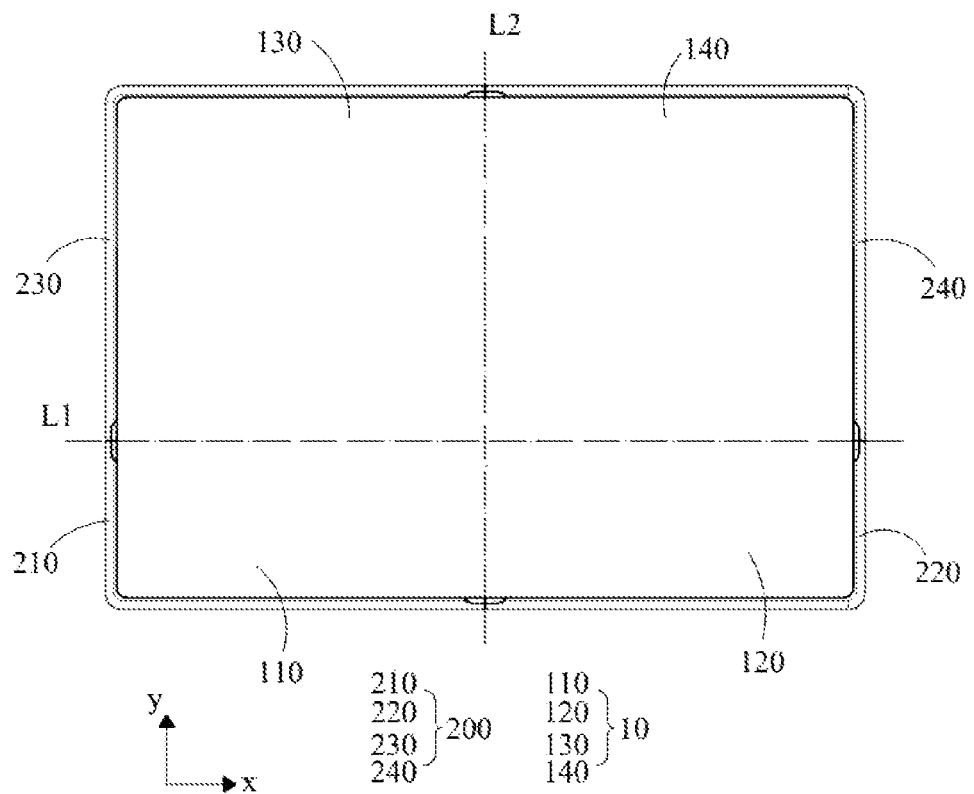
FIG. 2 is a schematic structural diagram of an electronic device provided by an embodiment of the application in a flat state.

As shown in FIG. 2, FIG. 2 is a schematic structural diagram of an electronic device provided by the embodiment of the present application in a flat state. The flexible display panel 100 further includes at least one transverse hinge and at least one longitudinal hinge (not shown in the figure). The transverse hinge is configured to be expandable or closed around a first axis L1, and the longitudinal hinge is configured to be expandable or closed around a second axis L2.

In the embodiment of the present application, the first axis L1 is parallel to a first direction x, the second axis L2 is parallel to a second direction y, and the first direction x is perpendicular to the second direction y. In practical applications, the first direction x may also cross the second direction y to form a certain angle, but not perpendicular to the second direction y.

The middle frame 200 includes at least a first middle frame 210, a second middle frame 220, a third middle frame 230, and a fourth middle frame 240. Opposite ends of the transverse hinge are connected to the first middle frame 210 and the third middle frame 230, respectively. The opposite ends of the transverse hinge are also connected to the second middle frame 220 and the fourth middle frame 240, respectively, so that the first middle frame 210 and the third middle frame 230 can rotate around the first axis L1, and the second middle frame 220 and the fourth middle frame 240 can rotate around the first axis L1.

Opposite ends of the longitudinal hinge are connected to the first middle frame 210 and the second middle frame 220 respectively. The opposite ends of the longitudinal hinges are also connected to the third middle frame 230 and the fourth middle frame 240 respectively, so that the first middle frame 210 and the second middle frame 220 can rotate around the second axis L2, and the third middle frame 230 and the fourth middle frame 240 can rotate around the second axis L2, thereby realizing the function of transverse and longitudinal bidirectional folding of the electronic device.

The flexible display panel main body 10 is divided into four areas by the first axis L1 and the second axis L2 intersecting, which are a first display area 110, a second display area 120, a third display area 130, and a fourth display area 140, respectively. The four areas are correspondingly arranged on the four middle frames, respectively.

As shown in FIG. 2, when the electronic device is in a flat state, at least part of each of the first display area 110, the second display area 120, the third display area 130, and the fourth display area 140 may be on the same plane. An angle between the display area 110 and the second display area 120 is about 180°, and an angle between the first display area 110 and the third display area 130 is about 180°.

When the electronic device is in a first bending state, the first display area 110 faces the third display area 130, where the angle between the first display area 110 and the third display area is about 0°, and the second display area 120 faces the fourth display area 140, where an angle between the second display area 120 and the fourth display area 140 is about 0°. The angle between the first display area 110 and the second display area 120 remains same as an angle when the electronic device is in a flat state.

When the electronic device is folded from the flat state to the first bending state, the first middle frame 210 and the second middle frame 220 can respectively move toward the third middle frame 230 and the fourth middle frame 240 around the first axis L1 through an action of the transverse hinge. In this process, the electronic device can be hovered at a certain angle or any angle through the connection and retention function of the transverse hinge.

Figure 3:
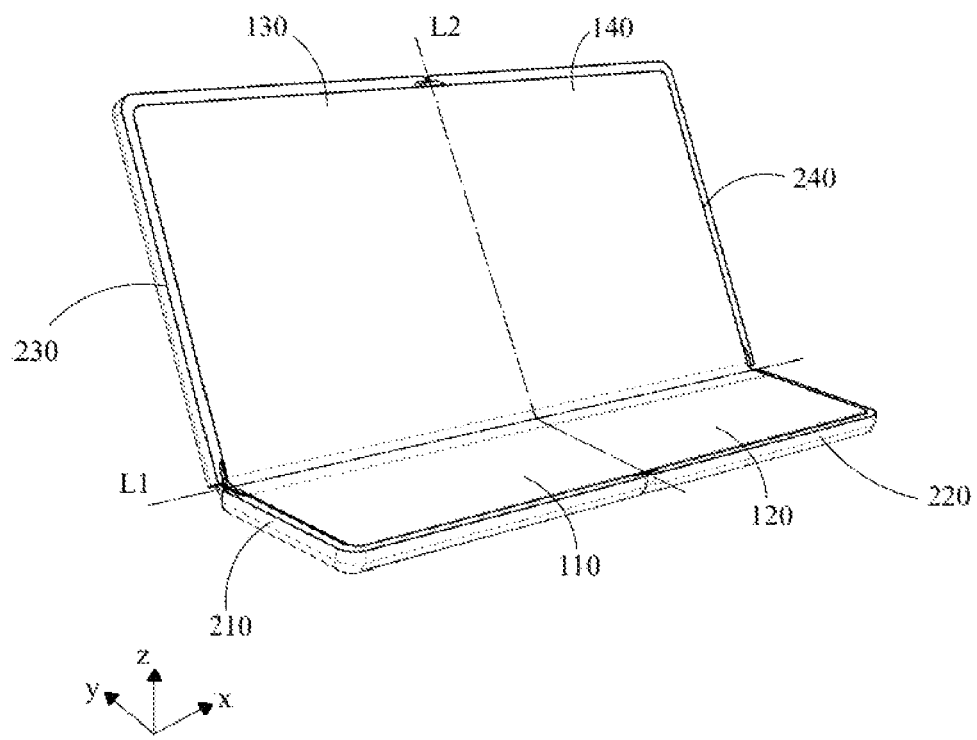
FIG. 3 is a schematic structural diagram of an electronic device provided by an embodiment of the application in a transitional bending state.

As shown in FIG. 3. FIG. 3 is a schematic structural diagram of the electronic device provided by the embodiment of the present application in a transitional bending state, where the transitional bending state shown in FIG. 3 is a state between the flat state and the first bending state. When the electronic device is in the transitional bending state, a certain angle may be formed between the first display area 110 and the third display area 130, and between the second display area 120 and the fourth display area 140, where the angle can be between 0° and 180°, such as 150°, 120° or 90°. At this time, the third display area 130 and the fourth display area 140 with larger areas can be used as a main display portion, and the first display area 110 and the second display area 120 with smaller areas can be used as auxiliary display portions, or they can be used as a function of a keyboard with software, so as to realize a function of office usage of a notebook.

Figure 4:
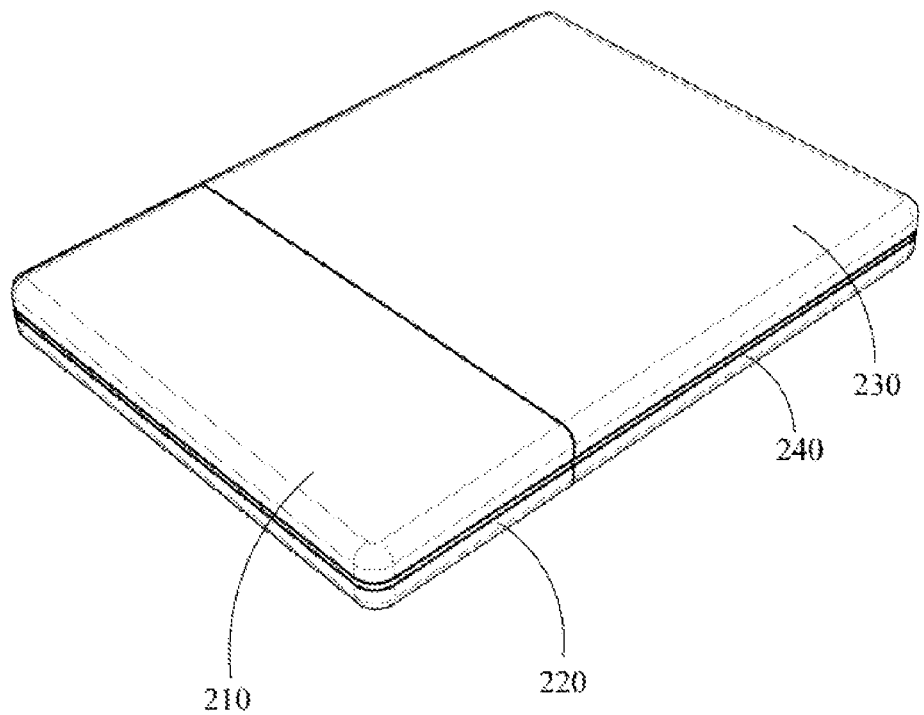
FIG. 4 is a schematic structural diagram of an electronic device provided by an embodiment of the application in a second bending state.

As shown in FIG. 4, FIG. 4 is a schematic structural diagram of the electronic device provided by the embodiment of the present application in a second bending state. When the electronic device is in the second bending state, the first display area 110 faces the second display area 120, and the third display area 130 faces the fourth display area 140, where the angle between the first display area 110 and the second display area 120 is about 0°, an angle between the third display area 130 and the fourth display area 140 is also about 0°, and the angle between the first display area 110 and the third display area 130 is about 180°. In this case, an angle between a front side of the first middle frame 210 and a front side of the second middle frame 220 is about 0°, and the angle between a front side of the third middle frame 230 and a front side of the fourth middle frame 240 is about 0°. In this way, the flexible display panel main body 10 can be hidden between the middle frames 200 to prevent the flexible display panel main body 10 from being damaged by external force.

As shown in FIGS. 2 and 4, when the electronic device is folded from the flat state to the second bending state, the first middle frame 210 and the third middle frame 230 can respectively move toward the second middle frame 220 and the fourth middle frame 240 around the second axis L2 through the action of the longitudinal hinge, and gradually approach the front sides of the second middle frame 220 and the fourth middle frame 240. In this process, the electronic device can hover at a certain angle or any angle through the connection and retention of the longitudinal hinge.

Figure 5:
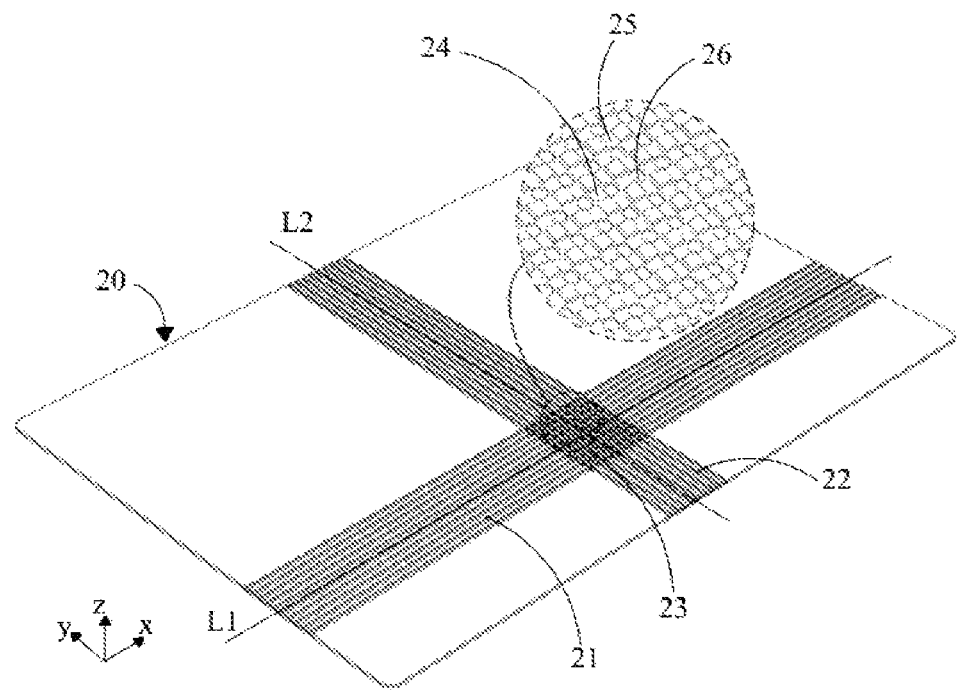
FIG. 5 is a schematic structural diagram of a support plate provided by an embodiment of the application.

Further, as shown in FIG. 5, FIG. 5 is a schematic structural diagram of a support plate provided by the embodiment of the present application. The support plate 20 includes a first bending portion 21, a second bending portion 22, and a bidirectional bending portion 23. The bending portion 21 extends along the first direction x, the second bending portion 22 extends along the second direction y, and the bidirectional bending portion 23 is disposed at an intersection of the first bending portion 21 and the second bending portion 22.

In practical applications, the number of the first bending portions 21, the second bending portions 22, and the bidirectional bending portions 23 in the support plate 20 is not limited to one in the above-mentioned embodiment, and the support plate 20 can also have two or more first bending portions 21, second bending portions 22, and bidirectional bending portions 23 at a same time.

When the electronic device is folded from the flat state to the first bending state, the first bending portion 21 and the bidirectional bending portion 23 of the support plate 20 can be bent from the flat state to the first bending state around the first axis L1. When the electronic device is folded from the flat state to the second bending state, the second bending portion 22 and the bidirectional bending portion 23 of the support plate 20 can be bent from the flat state to the second bending state around the second axis L2.

The bidirectional bending portion 23 includes a plurality of first patterned structures 24, where the plurality of first patterned structures 24 extend along the first direction x and are arranged along the second direction y. In this way, a local thickness of the bidirectional bending portion 23 can be reduced, the bending stiffness of the bidirectional bending portion 23 in the direction of the first axis L1 can be reduced, and the flexibility of the bidirectional bending portion 23 can be improved, thereby reducing the bending stress applied to the flexible display panel main body 10 during the bending process of the bidirectional bending portion 23 of the support plate 20 along the first axis L1.

The bidirectional bending portion 23 also includes a plurality of second patterned structures 25, where the plurality of second patterned structures 25 extend along the second direction y and are arranged along the first direction x. In this way, the local thickness of the bidirectional bending portion 23 can be reduced, the bending stiffness of the bidirectional bending portion 23 in the direction of the second axis L2 can be reduced, and the flexibility of the bidirectional bending portion 23 can be further improved, thereby reducing the bending stress applied to the flexible display panel main body 10 during the bending process of the bidirectional bending portion 23 of the support plate 20 along the second axis L2.

The bidirectional bending portion 23 also includes a plurality of third patterned structures 26, where the third patterned structures 26 are formed at an intersection of the first patterned structure 24 and the second patterned structure 25. In this way, by disposing the third patterned structure 26 at the intersection of the first patterned structure 24 and the second patterned structure 25, a thickness of the bidirectional bending portion 23 at the intersection of the first patterned structure 24 and the second patterned structure 25 can be further reduced, improving a tensile performance of the bidirectional bending portion 23 in this area, so that the bidirectional bending portion 23 can bear the bending stress in both the transverse and longitudinal directions at the same time, the bidirectional bending portion 23 can be adapted to the bending stress and deformation of the adjacent adhesive layer or film layer, reducing the risk of film layer debonding or display device layer fracturing due to stress mismatch and uncoordinated deformation between the support plate 20 and the adjacent adhesive layer or film layer.

Further, the first patterned structures 24 partially extend into the support plate 20 in a third direction z, and the second patterned structures 25 partially extend into the support plate 20 in the third direction z, where the third direction z is perpendicular to the first direction x and the second direction y.

In the embodiment of the present application, the third direction z is a thickness direction of the support plate 20. The first patterned structures 24 and the second patterned structures 25 are both grooves. The first patterned structures 24 and the second patterned structures 25 are recessed from a same side surface of the support plate 20 to the inside of the support plate 20, but do not penetrate the support plate 20.

In the embodiment of the present application, the first patterned structures 24 and the second patterned structures 25 are both defined on a side of the support plate 20 away from the flexible display panel main body 10, and at a same time, except for the first bending portion 21, the second bending portion 22, and the bidirectional bending portion 23 in the support plate 20, on the other regions where no patterned etching treatment is performed, thereby improving the tensile performance of the support plate 20 in the bidirectional bending portion 23 while maintaining a flatness of the flexible display panel main body 10.

In the embodiment of the present application, as shown in FIG. 5, the first patterned structures 24 extend from a first end of the bidirectional bending portion 23 to a second end of the bidirectional bending portion 23 along the first direction x, and the plurality of the first patterned structures 24 are arranged side by side in the second direction y. The plurality of second patterned structures 25 extend from a third end of the bidirectional bending portion 23 to a fourth end of the bidirectional bending portion 23 along the second direction y, and the plurality of second patterned structures 25 are arranged side by side in the first direction x.

As shown in FIG. 5, the cross-sectional profiles of the first patterned structure 24 and the second patterned structure 25 parallel to the first direction x and the second direction y are rectangular. A length direction of the first patterned structure 24 is parallel to the first direction x, and a width direction of the first patterned structure 24 is parallel to the second direction y. A length direction of the second patterned structure 25 is parallel to the second direction y, and a width direction of the second patterned structure 25 is parallel to the first direction x.

Figure 6:
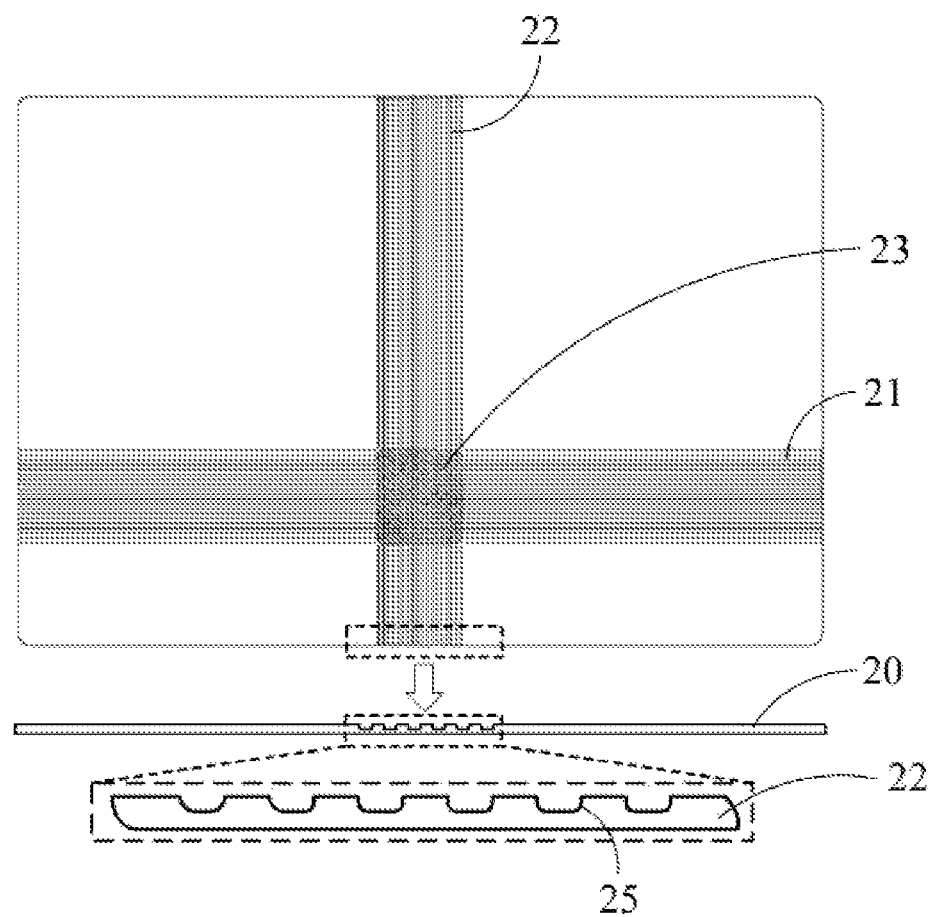
FIG. 6 is a partial enlarged schematic diagram of a second bending portion provided by an embodiment of the application.

Further, please refer to FIGS. 5 to 6, FIG. 6 is a partial enlarged schematic diagram of the second bending portion provided by the embodiment of the present application. The first patterned structures 24 and the second patterned structures 25 are not only arranged in the bidirectional bending portion 23, the first patterned structures 24 also extend from the first end and the second end of the bidirectional bending portion 23 to a first end and a second end of the first bending portion 21 along the first direction x, respectively. The second patterned structures 25 also extend from the third end and the fourth end of the bidirectional bending portion 23 to a first end and a second end of the second bending portion 22 along the second direction y, respectively.

By extending the first patterned structures 24 to the first bending portion 21 and extending the second patterned structures 25 to the second bending portion 22, local thickness of the first bending portion 21 and the second bending portion 22 can be reduced, so that the stiffness of the first bending portion 21 and the second bending portion 22 can be reduced, thereby improving the tensile performance of the support plate 20 at the first bending portion 21 and the second bending portion 22.

Further, the third patterned structures 26 penetrate the support plate 20 in the third direction z.

Since the first patterned structures 24 and the second patterned structures 25 are both grooves and do not penetrate the support plate 20, material of the support plate 20 still exists in the bidirectional bending portion 23 at the intersection of the first patterned structures 24 and the second patterned structures 25, thereby affecting the tensile performance of the bidirectional bending portion 23 at the intersection of the first patterned structures 24 and the second patterned structures 25.

As shown in FIG. 5, the third patterned structure 26 is a through hole. The third patterned structure 26 is defined at the intersection of the first patterned structure 24 and the second patterned structure 25, and penetrates the support plate 20, which can reduce the bending stiffness of the bidirectional bending portion 23 at the intersection of the first patterned structure 24 and the second patterned structure 25, thereby improving the tensile performance of the bidirectional bending portion 23.

In practical applications, the third patterned structure 26 is not limited to a through hole, but can also be a groove. The third patterned structure 26 can partially extend into the support plate 20 in the third direction z, and is defined on one side of the support plate 20 away from the flexible display panel 10, this can also reduce the local stiffness of the bidirectional bending portion 23 at the intersection of the first patterned structure 24 and the second patterned structure 25, and improve the tensile performance of the bidirectional bending portion 23 in this area, while ensuring the flatness of the flexible display panel main body 10.

Figure 7:
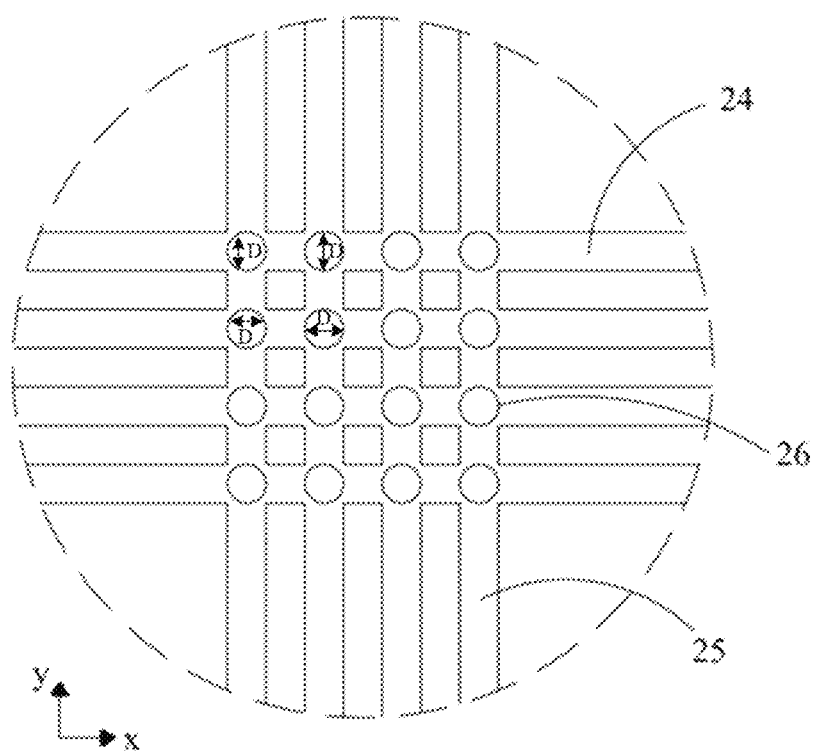
FIG. 7 is an enlarged schematic diagram of a first type of bidirectional bending portion provided by an embodiment of the application.

As shown in FIG. 7, FIG. 7 is an enlarged schematic diagram of the first bidirectional bending portion provided by the embodiment of the present application. The cross-sectional profile of the third patterned structure 26 parallel to the first direction x and the second direction y is circular. Setting the cross-sectional profile of the third patterned structure 26 into a circular shape is beneficial to improve the bending performance of the bidirectional bending portion 23 in the first direction x and the second direction y, and can also reduce the processing difficulty of the support plate 20.

Figure 8:
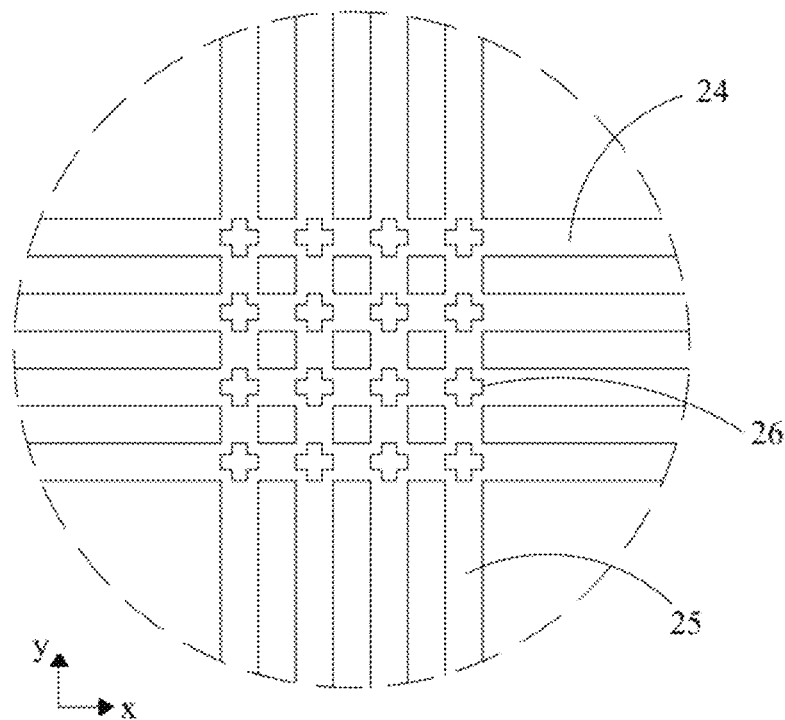
FIG. 8 is an enlarged schematic diagram of a second type of bidirectional bending portion provided by an embodiment of the application.

As shown in FIG. 8, FIG. 8 is an enlarged schematic diagram of the second bidirectional bending portion provided by the embodiment of the present application. The cross-sectional profile of the third patterned structure 26 may also be in a cross shape. It should be noted that only the cross-sectional profile of the third patterned structure 26 is illustrated in FIG. 7 and FIG. 8. The number of the first patterned structures 24, the second patterned structures 25, and the third patterned structures 26 in FIG. 7 and FIG. 8 does not represent the number of the first patterned structures 24, the second patterned structures 25, and the third patterned structures 26 used in practical applications.

In practical applications, the cross-sectional profile of the third patterned structure 26 is not limited to the circular shape and the cross shape in the foregoing embodiment, but may also be an ellipse, a rounded rectangle, or other irregular shapes.

In the embodiment of the present application, the apertures of each of the third patterned structures 26 are same, so that the tensile performance of each part in the bidirectional bending portion 23 can be consistent, and the force applied to the bidirectional bending portion 23 in the bending process more uniform, while reducing the processing difficulty of the support plate 20.

In an embodiment, the aperture D of the third patterned structure 26 in the first direction x or the second direction y may gradually increase from the edge of the bidirectional bending portion 23 to the center of the bidirectional bending portion 23. The larger the aperture D of the third patterned structure 26, the lesser the bending stiffness of a corresponding region, and the better the tensile performance, which can make the bending stiffness of the bidirectional bending portion 23 gradually decrease from the edge to the center, and the tensile performance gradually increases, so that the support plate 20 can improve the tensile performance while maintaining good stiffness and support performance.

In an embodiment, the aperture D of the third patterned structure 26 can also be gradually reduced from the edge of the bidirectional bending portion 23 to the center of the bidirectional bending portion 23, so that the bending stiffness of the bidirectional bending portion 23 gradually increase from the edge to the center, and the tensile performance of the bidirectional bending portion 23 gradually increases from the center to the edge.

In the embodiment of the present application, the width of the first patterned structure 24 in the second direction y is equal to the width of the second patterned structure 25 in the first direction x, and the aperture D of the third patterned structure 26 is equal to the width of the first patterned structure 24 in the second direction y and the width of the second patterned structure 25 in the first direction x.

In practical applications, the aperture D of the third patterned structure 26 may also be less than the width of the first patterned structure 24 in the second direction y, and also less than the width of the second patterned structure 25 in the first direction x.

In the embodiment of the present application, in the second direction y, the width of the first patterned structure 24 is equal to the distance between adjacent first patterned structures 24, and in the first direction x, the width of the second patterned structure 25 is equal to the distance between adjacent second patterned structures 25, so that the force applied to each area of the bidirectional bending portion 23 can be more uniform.

Further, when the support plate 20 is in the first bending state, both the first bending portion 21 and the bidirectional bending portion 23 of the support plate 20 have a first curvature radius. When the support plate 20 is in the second bending state, both the second bending portion 22 and the bidirectional bending portion 23 of the support plate 20 have a second curvature radius. The first curvature radius is equal to the second curvature radius, so that the force applied to the support plate 20 at the bidirectional bending portion 23 is more uniform.

In the embodiment of the present application, the first curvature radius and the second curvature radius are both 5 millimeters (mm). In practical applications, the first curvature radius and the second curvature radius can be equal, and can also be equal. The values of the first curvature radius and the second curvature radius are not limited to the above 5 mm. The specific value can be determined according to requirements of the curvature radius, force analysis, and comprehensive experimental evaluation of rebound force of the electronic device to ensure the support performance and bending performance of the support plate.

The present application embodiment provides a support plate, a flexible display panel, and an electronic device. The electronic device includes the flexible display panel. The flexible display panel includes a flexible display panel main body and a support plate. The support plate is disposed at the bottom of the flexible display panel main body. The supporting plate includes a first bending portion, a second bending portion, and a bidirectional bending portion. The first bending portion extends along a first direction. The second bending portion extends along a second direction, where the first direction crosses the second direction. The bidirectional bending portion is disposed at an intersection of the first bending portion and the second bending portion. The bidirectional bending portion includes a plurality of first patterned structures, a plurality of second patterned structures, and a plurality of third patterned structures. The plurality of first patterned structures extend along the first direction and are arranged along the second direction. The plurality of second patterned structures extend along the second direction and are arranged along the first direction. By defining a third patterned structure at an intersection of a first patterned structure and a second patterned structure, a bending stiffness of the bidirectional bending portion is reduced, so that the support plate can adapt to a bending stress and deformation of an adjacent glue layer or film layer, thereby reducing a risk of debonding of the module and fracturing of the display device layer due to mismatched stress and uncoordinated deformation between the support plate and the film layer, and improving an overall yield and reliability of flexible display panels and electronic devices.

In summary, although the preferred embodiments of the present application are disclosed as above, the above preferred embodiments are not intended to limit the application. Those of ordinary skill in the art can make various kinds of changes and modifications without departing from the spirit and scope of the application. Therefore, the scope of protection of the present application is based on the scope defined by the claims.

What is claimed is:

1. A supporting plate, comprising:
    a first bending portion, extending along a first direction;
    a second bending portion, extending along a second direction, wherein the first direction crosses the second direction; and
    a bidirectional bending portion, disposed at an intersection of the first bending portion and the second bending portion, comprising:
        a plurality of first patterned structures, extending along the first direction and arranged along the second direction;
        a plurality of second patterned structures, extending along the second direction and arranged along the first direction; and
        a plurality of third patterned structures, defined at an intersection of the first patterned structures and the second patterned structures;
    wherein the first patterned structures extend to the first bending portion, and the second patterned structures extend to the second bending portion.

2. The support plate of claim 1, wherein the first patterned structures partially extend into the support plate in a third direction, and the second patterned structures partially extend into the support plate in the third direction, the third direction is perpendicular to the first direction and the second direction.

3. The support plate of claim 2, wherein the third patterned structures penetrate the support plate in the third direction.

4. The support plate of claim 3, wherein a cross-sectional profile of the third patterned structure is a circle, an ellipse, a rounded rectangle, or a cross.

5. The support plate of claim 4, wherein an aperture of the third patterned structure is less than or equal to a width of the first patterned structure in the second direction, and the aperture of the third patterned structure is less than or equal to a width of the second patterned structure in the first direction.

6. The support plate of claim 5, wherein the aperture of the third patterned structure gradually increases or gradually decreases from an edge of the bidirectional bending portion to a center of the bidirectional bending portion.

7. The support plate of claim 1, wherein the first patterned structures extend along the first direction from a first end of the bidirectional bending portion to a second end of the bidirectional bending portion, and a plurality of the first patterned structures are arranged side by side in the second direction; and the second patterned structures extend along the second direction from a third end of the bidirectional bending portion to a fourth end of the bidirectional bending portion, and a plurality of the second patterned structures are arranged side by side in the first direction.

8. The support plate of claim 7, wherein the first patterned structures extend along the first direction from the first end and the second end of the bidirectional bending portion to a first end and a second end of the first bending portion, respectively; and the second patterned structures extend along the second direction from the third end and the fourth end of the bidirectional bending portion to a first end and a second end of the second bending portion, respectively.

9. The support plate of claim 1, wherein in the second direction, a width of the first patterned structure is equal to a distance between adjacent first patterned structures; and in the first direction, a width of the second patterned structure is equal to a distance between adjacent second patterned structures.

10. The support plate of claim 1, wherein a curvature radius of the bidirectional bending portion after bending along a first axis parallel to the first direction is equal to a curvature radius of the bidirectional bending portion after bending along a second axis parallel to the second direction.

11. A flexible display panel, comprising:
a flexible display panel main body; and
a support plate, disposed at a bottom of the flexible display panel main body, comprising:
a first bending portion, extending along a first direction;
a second bending portion, extending along a second direction, wherein the first direction crosses the second direction; and
a bidirectional bending portion, disposed at an intersection of the first bending portion and the second bending portion, comprising:
a plurality of first patterned structures, extending along the first direction and arranged along the second direction;
a plurality of second patterned structures, extending along the second direction and arranged along the first direction; and
a plurality of third patterned structures, defined at an intersection of the first patterned structures and the second patterned structures;
wherein the first patterned structures extend to the first bending portion, and the second patterned structures extend to the second bending portion.

12. The flexible display panel of claim 11, wherein the first patterned structures partially extend into the support plate in a third direction, and the second patterned structures partially extend into the support plate in the third direction, the third direction is perpendicular to the first direction and the second direction.

13. The flexible display panel of claim 12, wherein the third patterned structures penetrate the support plate in the third direction.

14. The flexible display panel of claim 13, wherein a cross-sectional profile of the third patterned structure is a circle, an ellipse, a rounded rectangle, or a cross.

15. The flexible display panel of claim 14, wherein an aperture of the third patterned structure is less than or equal to a width of the first patterned structure in the second direction, and the aperture of the third patterned structure is less than or equal to a width of the second patterned structure in the first direction.

16. The flexible display panel of claim 15, wherein the aperture of the third patterned structure gradually increases or gradually decreases from an edge of the bidirectional bending portion to a center of the bidirectional bending portion.

17. The flexible display panel of claim 11, wherein the first patterned structures extend along the first direction from a first end of the bidirectional bending portion to a second end of the bidirectional bending portion, and a plurality of the first patterned structures are arranged side by side in the second direction; and the second patterned structures extend along the second direction from a third end of the bidirectional bending portion to a fourth end of the bidirectional bending portion, and a plurality of the second patterned structures are arranged side by side in the first direction.

18. The flexible display panel of claim 17, wherein the first patterned structures extend along the first direction from the first end and the second end of the bidirectional bending portion to a first end and a second end of the first bending portion, respectively; and the second patterned structures extend along the second direction from the third end and the fourth end of the bidirectional bending portion to a first end and a second end of the second bending portion, respectively.

19. The flexible display panel of claim 11, wherein in the second direction, a width of the first patterned structure is equal to a distance between adjacent first patterned structures; and in the first direction, a width of the second patterned structure is equal to a distance between adjacent second patterned structures.

20. An electronic device, comprising a flexible display panel, wherein the flexible display panel comprises a flexible display panel main body and a support plate, the support plate is disposed at a bottom of the flexible display panel main body, the support plate comprises:
a first bending portion, extending along a first direction;
a second bending portion, extending along a second direction, wherein the first direction crosses the second direction; and
a bidirectional bending portion, disposed at an intersection of the first bending portion and the second bending portion, comprising:
a plurality of first patterned structures, extending along the first direction and arranged along the second direction;
a plurality of second patterned structures, extending along the second direction and arranged along the first direction; and
a plurality of third patterned structures, defined at an intersection of the first patterned structures and the second patterned structures;
wherein the first patterned structures extend to the first bending portion, and the second patterned structures extend to the second bending portion.

* * * * *